United States Patent

Shibayama

[11] Patent Number: 5,227,920
[45] Date of Patent: Jul. 13, 1993

[54] ZOOM LENS

[75] Inventor: Atsushi Shibayama, Kawasaki, Japan

[73] Assignee: Nikon Corporation, Tokyo, Japan

[21] Appl. No.: 967,132

[22] Filed: Oct. 27, 1992

[30] Foreign Application Priority Data

Nov. 7, 1991 [JP] Japan .................................. 3-319829

[51] Int. Cl.$^5$ ....................... G02B 15/14; G02B 13/18
[52] U.S. Cl. .................................... 359/692; 359/685; 359/713
[58] Field of Search ............... 359/676, 685, 691, 692, 359/713

[56] References Cited

U.S. PATENT DOCUMENTS

| | | | |
|---|---|---|---|
| 4,679,913 | 7/1987 | Sato et al. | 359/692 |
| 4,787,721 | 11/1988 | Fukushima et al. | 359/713 |
| 4,818,081 | 4/1989 | Ito | 359/692 |
| 4,836,660 | 6/1989 | Ito | 359/692 |
| 4,911,539 | 3/1990 | Tsunashima et al. | 350/423 |
| 4,929,069 | 5/1990 | Shibayama | 359/692 |
| 5,144,489 | 9/1992 | Shibayama | 359/689 |

FOREIGN PATENT DOCUMENTS 4-225309 8/1992 Japan .

Primary Examiner—Bruce Y. Arnold
Assistant Examiner—David Parsons
Attorney, Agent, or Firm—Shapiro and Shapiro

[57] ABSTRACT

A compact zoom lens, which can attain a compact lens system while maintaining a simple lens arrangement including six lenses, and can minimize deterioration of performance caused by a variation upon assembling, is disclosed. The compact zoom lens includes a positive first lens group $G_1$ and a negative second lens group $G_2$. The first lens group $G_1$ has, in turn from the object side, a positive meniscus lens component $L_1$ with the convex surface facing the object side, a meniscus-shape junction negative lens component $L_2$ constituted by a double-concave negative lens component $L_{2n}$ and a double-convex positive lens component $L_{2p}$, and a double-convex positive lens component $L_3$. The second lens group $G_2$ has, in turn from the object side, a positive meniscus lens component $L_4$ with the convex surface facing the image side, and a negative meniscus lens component $L_5$ with the convex surface facing the image side, and at least one lens surface of the second lens group $G_2$ is formed to have an aspherical surface shape. The zoom lens satisfies six conditions.

10 Claims, 6 Drawing Sheets

ZOOM LENS

BACKGROUND OF THE INVENTION

1. Field of the Invention

The present invention relates to a zoom lens suitable for a compact camera.

2. Related Background Art

As a photographing lens for a recent lens shutter type compact camera, a zoom lens tends to be popular. In a zoom lens of this type, a compact and low-cost structure is demanded in correspondence with a compact and low-cost structure of the camera main body. For example, U.S. Pat. No. 4,929,069 discloses a zoom lens, which is constituted by as a small number of lenses as six lenses, and can attain low cost and a certain compact structure.

However, the zoom lens disclosed in U.S. Pat. No. 4,929,069 is larger than a two-focal point switching lens as a popular lens in a conventional multi-functional compact camera, and the size of a camera itself equipped with this lens is also increased. Since a conventional zoom lens suffers from relatively serious deterioration of performance due to a variation in assembling, a long assembling/adjustment time is required to realize performance as designed, resulting in relatively low productivity.

SUMMARY OF THE INVENTION

It is, therefore, an object of the present invention to provide a zoom lens, which has a further compact lens system while maintaining a simple lens structure constituted by about six lenses, and has high productivity with relatively small influence on performance due to a variation in assembling.

In order to achieve the above object, according to one aspect of the present invention, there is provided a zoom lens, which includes a first lens group $G_1$ having a positive refracting power and a second lens group $G_2$ having a negative refracting power, and performs a zooming operation from a wide-angle end to a telephoto end by decreasing a space between the first and second lens groups $G_1$ and $G_2$, wherein the first lens group $G_1$ has, in order from an object side, a positive meniscus lens component $L_1$ with a convex surface facing the object side, a cemented negative lens component $L_2$ constituted by a double-concave negative lens component $L_{2n}$ and a double-convex positive lens component $L_{2p}$, and having a meniscus shape as a whole, and a double-convex positive lens component $L_3$, the second lens group $G_2$ has, in order from the object side, a positive meniscus lens component $L_4$ with a convex surface facing an image side, and a negative meniscus lens component $L_5$ with a convex surface facing the image side, and the zoom lens is arranged to satisfy the following conditions:

$$0.09 < dL_2/f_W < 0.18 \quad (1)$$

$$0.45 < (nL_{2n} - nL_{2p}) \cdot f_W/r_4 < 0.9 \quad (2)$$

$$-4 < fL_2/f_1 < -1.8 \quad (3)$$

$$1.1 < fL_3/f_1 < 1.6 \quad (4)$$

where $f_W$: the focal length of the entire system at the wide-angle end $dL_2$: the axial lens thickness of the cemented negative lens component $L_2$ in the first lens group $G_1$ $nL_{2n}$: the refractive index of the double-concave negative lens component $L_{2n}$ forming the cemented negative lens component $L_2$ in the first lens group $G_1$ $nL_{2p}$: the refractive index of the double-convex positive lens component $L_{2p}$ forming the cemented negative lens component $L_2$ in the first lens group $G_1$ $r_4$: the radius of curvature of the cemented surface in the cemented negative lens component $L_2$ in the first lens group $G_1$ $fL_2$: the focal length of the cemented negative lens component $L_2$ in the first lens group $G_1$ $fL_3$: the focal length of the double-convex positive lens component $L_3$ in the first lens group $G_1$ $f_1$: the focal length of the first lens group $G_1$.

In the zoom lens constituted by the two, i.e., positive and negative lens groups with the above arrangement, a positive distortion at the wide-angle side normally tends to be increased. In particular, like in the present invention, when the second lens group $G_2$ is constituted by as a small number of lenses as two lenses, the positive distortion is easily generated in the second lens group $G_2$.

Therefore, in order to correct the distortion in the entire lens system, a negative distortion must be generated in the first lens group $G_1$.

For this purpose, it is preferable that the cemented negative lens component $L_2$ effective generates a negative distortion while suppressing generation of a positive distortion in the positive lens component $L_1$ located at the most object side. Thus, the positive lens component $L_1$ is formed to have a meniscus shape with the convex surface facing the object side, so that the incident and exit angles of a principal ray outside the optical axis (the central ray of an oblique light beam) passing the object- and image-side surfaces of the positive lens component $L_1$ with respect to the normals to the two lens surfaces are not increased, thereby preventing the principal ray outside the optical axis from being refracted largely.

On the other hand, the cemented negative lens component $L_2$ has the concave object-side surface to largely refract the principal ray outside the optical axis.

In order to suppress generation of the positive distortion in the second lens group $G_2$ having the negative refracting power, the negative lens component $L_5$ is formed to have a meniscus shape with the concave surface facing the object side, so that the incident angle of the principal ray outside the optical axis with respect to the normal to the lens surface is decreased.

With the above arrangement, the present invention is advantageous for the distortion.

In the present invention, the negative lens component $L_2$ in the first lens group $G_1$ comprises a cemented lens constituted by the double-concave negative lens $L_{2n}$ and the double-convex positive lens $L_{2p}$, thereby effectively correcting a spherical aberration and a chromatic aberration. In particular, since the negative lens component $L_2$ has a cemented surface having a positive radius of curvature, a fluctuation of a chromatic aberration of magnification generated upon zooming can be suppressed. Furthermore, as compared to a case wherein the negative lens $L_{2n}$ and the positive lens $L_{2p}$ are separated, a cause for deteriorating performance due to decentering can be removed, thus improving productivity.

In the present invention, since the second lens group $G_2$ has the negative refracting power, a positive spherical aberration is easily generated in the second lens group $G_2$. In particular, when a zooming operation is performed from the wide-angle end toward the telephoto end, the spherical aberration tends to increase in the positive direction.

Therefore, in order to suppress a fluctuation of a spherical aberration upon zooming, a negative spherical aberration must be intentionally generated in the positive lens component $L_4$ located at the object side in the second lens group $G_2$ so as to satisfactorily correct the spherical aberration in the second lens group $G_2$. For this purpose, the positive lens component $L_4$ is formed to have a meniscus shape with the convex surface facing the image side so as to generate many negative spherical aberration components, thereby correcting the fluctuation of the spherical aberration upon zooming with a good balance. In addition, the positive lens component $L_4$ is advantageous for correction of an astigmatism and a coma since it has a shape for decreasing the incident angle of the principal ray outside the optical axis with respect to the normal to the lens surface.

Under the assumption of the detailed lens shapes in the lens groups described above, the conditions (1) to (4) according to the present invention are set for the following reasons.

The condition (1) defines the axial lens thickness of the cemented negative lens component $L_2$ in the first lens group $G_1$, which thickness is suitable for achieving both a compact lens system and correction of a positive distortion at the wide-angle end.

When the axial lens thickness of the lens component $L_2$ exceeds the upper limit of the condition (1), the size of the first lens group $G_1$ is increased, and the size of the camera as a whole is undesirably increased.

When the axial lens thickness of the lens component $L_2$ is set below the lower limit of the condition (1), the distance between the object-side surface of the cemented negative lens component $L_2$ and an aperture stop arranged immediately after the first lens group $G_1$ is decreased, it becomes difficult to effectively generate a negative distortion at the object-side surface of the junction negative lens component $L_2$, and the positive distortion generated in the second lens group cannot be canceled.

The condition (2) defines a range of the refracting power at the cemented surface of the cemented negative lens component $L_2$ in the first lens group $G_1$, which range is suitable for satisfactorily correcting a spherical aberration, a coma, and the like.

When the refracting power is set below the lower limit of the condition (2), the refracting power at the cemented surface of the cemented negative lens component $L_2$ is decreased, and the spherical aberration cannot be satisfactorily corrected. As a result, it becomes difficult to perform well-balanced aberration correction including various other aberrations.

On the other hand, when the refracting power is set above the upper limit of the condition (2), the refracting power at the cemented surface of the cemented negative lens component $L_2$ is increase too much. As a result, a coma is generated at the wide-angle end, and a so-called negative coma state undesirably occurs.

The conditions (3) and (4) define the power distribution of the lens components in the first lens group $G_1$ so as to attain a compact zoom lens structure, improved productivity, and satisfactory correction of various aberrations at the same time.

Of these conditions, the condition (3) defines the focal length $fL_2$ of the cemented negative lens component $L_2$ in the first lens group $G_1$. When the cemented negative lens component $L_2$ is formed to have a relatively large focal length, even when the cemented negative lens component $L_2$ is relatively decentered or inclined in the first lens group $G_1$, image formation performance is not easily deteriorated, and this leads to improvement of productivity.

When the focal length exceeds the upper limit of the condition (3), the focal length of the cemented negative lens component $L_2$ is decreased, and the above-mentioned effect cannot be obtained.

When the focal length is set below the lower limit of the condition (3), the negative refracting power of the cemented negative lens component $L_2$ is weakened, and it becomes difficult to satisfactorily correct various aberrations such as a spherical aberration.

The condition (4) defines the focal length $fL_3$ of the double-convex positive lens component $L_3$ in the first lens group $G_1$. Since the negative refracting power of the cemented negative lens component $L_2$ in the first lens group $G_1$ is relatively weakened by the condition (3), the refracting power of the double-convex positive lens component $L_3$ can also be weakened as compared to the refracting power of the first lens group $G_1$.

For this reason, as in the case of the cemented negative lens component $L_2$, even when the positive lens component $L_3$ is relatively decentered or inclined, image formation performance is not easily deteriorated, and this leads to improvement of productivity.

When the focal length exceeds the upper limit of the condition (4), the refracting power of the positive lens component $L_3$ becomes too weak, and the rear-side principal point of the first lens group $G_1$ is separated farther toward the object side from the final lens surface of the first lens group $G_1$. For this reason, when a zooming operation is performed toward the telephoto side, the first and second lens groups $G_1$ and $G_2$ tend to mechanically interfere with each other, and consequently, a sufficient zoom ratio cannot be obtained.

When the focal length is set below the lower limit of the condition (4), the refracting power of the positive lens component $L_3$ becomes too strong, and performance is considerably deteriorated when the positive lens component $L_3$ is decentered or inclined, resulting in poor productivity. Since the rear-side principal point of the first lens group $G_1$ is located near the final lens surface of the first lens group $G_1$ or is located at the image side of the final lens surface, the total lens length is prolonged, thus disturbing the compact structure.

The zoom lens according to the present invention preferably satisfies the following conditions in addition to the above-mentioned conditions (1) to (4).

$$0.5 < \Sigma d_W / f_W < 0.85 \quad (5)$$

$$2 < fL_1 \cdot L_2 / f_1 < 9 \quad (6)$$

where $\Sigma d_W$: the axial lens thickness from the most object-side lens surface to the most image-side lens surface in the zoom lens at the wide-angle end $fL_1 \cdot L_2$: the composite focal length of the positive meniscus lens component $L_1$ and the cemented negative lens component $L_2$ in the first lens group $G_1$.

The condition (5) defines the axial lens thickness from the first lens surface to the final lens surface in the lens system at the wide-angle end, which thickness is suitable for attaining a compact lens system. When the axial lens thickness exceeds the upper limit of the condition (5), the total lens length at the wide-angle end is undesirably increased. When the axial lens thickness is to be decreased below the lower limit of the condition (5), the following three techniques may be proposed.

① The axial lens thickness of the first lens group $G_1$ is decreased. In consideration of a condition such as a lens edge thickness, the thickness of the cemented negative lens component $L_2$ is decreased in practice.

② The space between the first and second lens groups $G_1$ and $G_2$ is decreased.

③ The axial lens thickness of the second lens group $G_2$ is decreased. In practice, the space between the positive meniscus lens component $L_4$ and the negative meniscus lens component $L_5$ in the second lens group $G_2$ is decreased.

Of these techniques, with the technique ①, the distance between the object-side surface of the cemented negative lens component $L_2$ and the aperture stop arranged immediately after the first lens group $G_1$ becomes small, and it becomes difficult to effectively generate the negative distortion at the object-side surface of the cemented negative lens component $L_2$. As a result, the positive distortion generated in the second lens group $G_2$ cannot be canceled. With the technique ②, since the variable range of the group interval between the first and second lens groups $G_1$ and $G_2$ becomes small, a sufficient zoom ratio cannot be obtained.

Furthermore, with the technique ③, the difference between the height from the optical axis where a ray from the axial object point passes through the positive meniscus lens component $L_4$ in the second group $G_2$ and the height from the optical axis where the ray passes through the negative meniscus lens component $L_5$ becomes small, and it becomes difficult to satisfactorily correct a spherical aberration. Therefore, when the axial lens thickness is set below the lower limit of the condition (5), satisfactory correction can be made by none of the techniques ①, ②, and ③.

The condition (6) is a condition for reliably obtaining the effect of the conditions (3) and (4), and defines the composite focal length $fL_1 \cdot L_2$ of the positive meniscus lens component $L_1$ and the cemented negative lens component $L_2$ in the first lens group $G_1$.

When the focal length exceeds the upper limit of limit of the condition (6), the composite focal length $fL_1 \cdot L_2$ is prolonged, and the refracting power of the double-convex lens component $L_3$ must be strengthened accordingly. In this case, productivity is impaired, and the total lens length is undesirably increased like in the case wherein the focal length is set below the lower limit of the condition (4).

When the focal length is decreased below the lower limit of the condition (6), the composite focal length $fL_1 \cdot L_2$ is shortened, and the refracting power of the double-convex positive lens component $L_3$ must be weakened. In this case, a sufficient zoom ratio cannot be obtained like in the case wherein the focal length exceeds the upper limit of the condition (4).

When the composite power of the positive meniscus lens component $L_1$ and the cemented negative lens component $L_2$ is set to be a positive power according to the condition (6), the height where a ray from the axial object point passes through the double-convex positive lens component $L_3$ is lowered, and the lens diameter of the double-convex positive lens component $L_3$ can be decreased. Similarly, the full-open diameter of the aperture stop arranged immediately after the double-convex positive lens component $L_3$ can also be decreased, and the diameter of the entire zoom lens can be effectively decreased.

Furthermore, in the zoom lens according to the present invention, at least one lens surface in the second lens group $G_2$ is preferably formed as an aspherical surface. In addition, the spherical surface shape is preferably a one with which the positive refracting power is gradually increased from the center toward the peripheral portion of the lens, or a one with which the negative refracting power is gradually decreased from the center toward the peripheral portion of the lens.

When the aspherical surface in the second lens group $G_2$ is formed as described above, generation of the positive distortion in the second lens group $G_2$ can be suppressed. Furthermore, this aspherical surface shape is advantageous for correction of a spherical aberration since it is convenient for correcting the positive spherical aberration generated in the second lens group $G_2$.

When an axial chromatic aberration and a chromatic aberration of magnification are to be corrected with a good balance under the above-mentioned condition (2), the Abbe's numbers of the negative and positive lens components $L_{2n}$ and $L_{2p}$ forming the junction negative lens component $L_2$ are preferably set to satisfy the following condition (7):

$$17 < \nu L_{2p} - \nu L_{2n} < 30 \tag{7}$$

where $\nu L_{2p}$ and $\nu L_{2n}$ are defined as follows:

$\nu L_{2p}$: the Abbe's number of the double-convex positive lens component $L_{2p}$ forming the cemented negative lens component $L_2$ in the first lens group $G_1$ $\nu L_{2n}$: the Abbe's number of the double-concave negative lens component $L_{2n}$ forming the cemented negative lens component $L_2$ in the first lens group $G_1$.

Other objects, features, and effects of the present invention will be sufficiently apparent from the following detailed description taken in conjunction with the accompanying drawings.

DESCRIPTION OF THE PREFERRED EMBODIMENTS

The preferred embodiments of the present invention will be described in detail hereinafter with reference to the accompanying drawings.

A zoom lens according to each embodiment includes, in turn from the object side, a first lens group $G_1$ having a positive refracting power, and a second lens group $G_2$ having a negative refracting power. When a zooming operation from the wide-angle end to the telephoto end is performed, the first and second lens groups $G_1$ and $G_2$ are moved to decrease the space therebetween.

The first lens group $G_1$ has, in order from the object side, a positive meniscus lens component $L_1$ with the convex surface facing the object side, a meniscus-shape cemented negative lens component $L_2$ constituted by a double-concave negative lens component $L_{2n}$ and a double-convex positive lens component $L_{2p}$, and a double-convex lens component $L_3$. The second lens group $G_2$ has a positive meniscus lens component $L_4$ with the convex surface facing the image side, and a negative meniscus lens component $L_5$ with the convex surface facing the image side.

In each embodiment, the second lens group $G_2$ has an aspherical lens surface.

The specifications of the embodiments of the present invention will be presented below. In a table summarizing the specifications of each embodiment, the radius of curvature (the paraxial radius of curvature in the case of an aspherical surface) of the i-th (i=1, 2, ...) lens surface from the object side is represented by $r_i$, the lens surface interval between the i-th surface and the (i+1)-th surface is represented by $d_i$, the Abbe's number of a medium between the i-th surface and the (i+1)-th surface is represented by $\nu_{di}$, and the refractive index of the medium between the i-th surface and the (i+1)-th surface with respect to a d-line ($\lambda=587.6$ nm) is represented by $n_i$. In addition, f is the focal length of the entire system, $F_{NO}$ is the f-number, and $2\omega$ is the field angle.

The aspherical surface shape arranged in the second lens group $G_2$ of each embodiment is expressed by the following aspherical surface formula:

$$X(y) = y^2/[r\{1 + (1 - ky^2/r^2)^{\frac{1}{2}}\}] + C_2y^2 + C_4y^4 + C_5y^6 + C_6y^8 + C_{10}y^{10}$$

where $X(y)$ is the distance along the optical axis from the tangent plane tangent to the vertex of the aspherical surface to the position of a height y on the aspherical surface, r is the paraxial radius of curvature, $C_n$ (n=2 to 10) is the aspherical surface coefficient, and k is the conic constant of the aspherical surface.

First Embodiment

Figure 1:
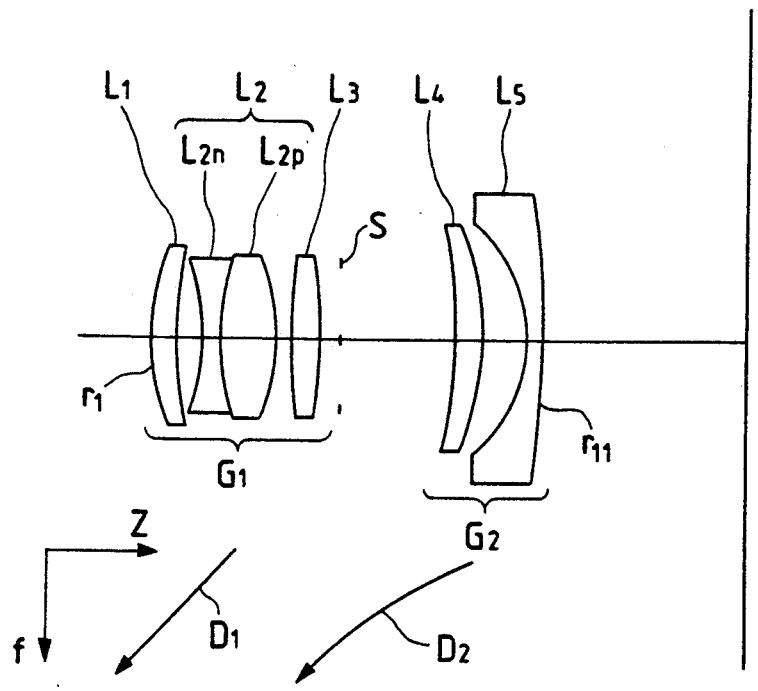
FIG. 1 is a chart showing a lens arrangement of a zoom lens according to the first embodiment of the present invention.

FIG. 1 is a chart showing the lens arrangement of the first embodiment at the wide-angle end. An aperture stop S is arranged immediately after the first lens group $G_1$. When the first and second lens groups $G_1$ and $G_2$ are respectively moved along moving paths $D_1$ and $D_2$ to decrease a gap therebetween, a zooming operation to the telephoto end is attained while maintaining a constant image surface. The components of the moving paths $D_1$ and $D_2$ in the optical axis direction (Z direction) indicate the positions of the corresponding lens groups on the optical axis, and the components in a direction (f direction) perpendicular to the optical axis direction indicate the focal lengths.

A focusing operation to a short-distance object may be attained by moving the first lens group $G_1$ toward the object side, by moving the second lens group $G_2$ toward the image-surface side, or by moving the entire zoom lens toward the object side. The same applies to the following embodiments.

Table 1 summarizes the specifications of the first embodiment. In this embodiment, since a zooming operation is performed by changing a surface interval $d_7$, the values of the focal length f of the entire system and a back focus B.f. (=surface interval $d_{11}$) obtained when the surface interval $d_7$ is varied are added after the lens data of Table 1. In the first embodiment, the eighth surface is the aspherical surface, and Table 2 summarizes the values of the aspherical coefficients and the conic constant.

TABLE 1

Specifications of the First Embodiment f = 39.0 to 63.1
$F_{NO}$ = 4.00 to 6.47
$2\omega$ = 56.7° to 37.7°

| i | $r_i$ | $d_i$ | $\nu_{di}$ | $n_i$ |
|---|---|---|---|---|
| 1 | 14.033 | 1.80 | 53.9 | 1.71300 |
| 2 | 29.125 | 1.70 | | |
| 3 | −14.454 | 1.30 | 45.0 | 1.74400 |
| 4 | 14.454 | 4.00 | 69.9 | 1.51860 |
| 5 | −12.206 | 1.00 | | |
| 6 | 33.099 | 2.00 | 64.1 | 1.51680 |
| 7 | −33.099 | variable | | |
| 8 | −30.944 | 2.10 | 35.0 | 1.74950 |
| 9 | −16.691 | 3.00 | | |
| 10 | −9.504 | 1.20 | 53.9 | 1.71300 |
| 11 | −60.319 | (B.f.) | | |
| f | 39.0003 | 50.0008 | 63.1015 | |
| $d_7$ | 9.6422 | 5.9755 | 3.2766 | |
| B.f. | 14.6038 | 26.0441 | 39.6687 | |

TABLE 2

Aspherical Surface Shape of Eighth Surface of the First Embodiment k = 0.0000
$C_2$ = 0.0000
$C_4$ = 0.4357 × $10^{-4}$
$C_6$ = 0.7315 × $10^{-6}$
$C_8$ = −0.7453 × $10^{-8}$
$C_{10}$ = 0.1202 × $10^{-9}$

Second Embodiment

Figure 2:
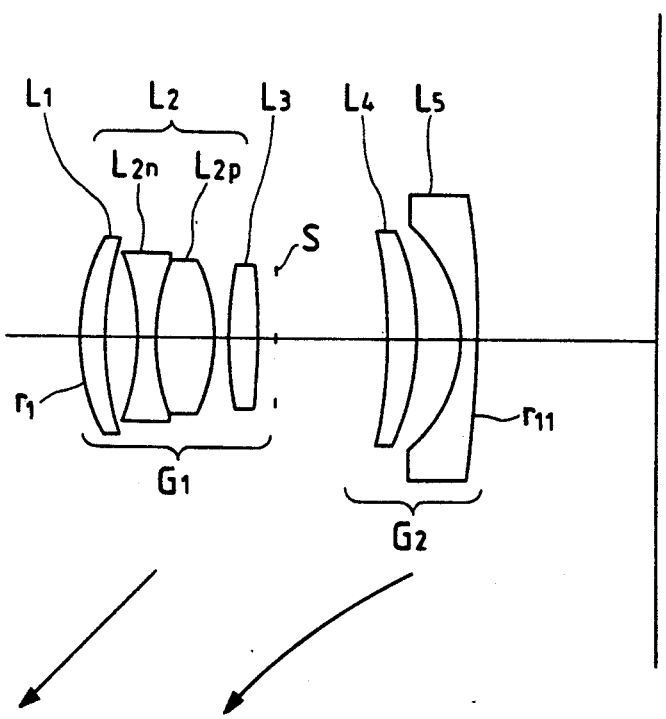
FIG. 2 is a chart showing a lens arrangement of a zoom lens according to the second embodiment of the present invention.

FIG. 2 is a chart showing the lens arrangement of the second embodiment. In the second embodiment, the eighth surface is also the aspherical surface, and Tables 3 and 4 below summarize the specifications of the second embodiment, and the aspherical surface coefficients and the like of the eighth surface.

TABLE 3

Specifications of the Second Embodiment $f = 36.0$ to $58.2$
$F_{NO} = 4.01$ to $6.49$
$2\omega = 60.6°$ to $40.8°$

| i | $r_i$ | $d_i$ | $\nu_{di}$ | $n_i$ |
|---|---|---|---|---|
| 1 | 13.041 | 1.80 | 50.2 | 1.72000 |
| 2 | 22.562 | 2.20 | | |
| 3 | −13.744 | 1.30 | 45.0 | 1.74400 |
| 4 | 13.553 | 4.00 | 69.9 | 1.51860 |
| 5 | −11.234 | 1.00 | | |
| 6 | 20.988 | 2.00 | 64.1 | 1.51680 |
| 7 | −56.402 | variable | | |
| 8 | −25.724 | 2.10 | 35.0 | 1.74950 |
| 9 | −15.133 | 3.00 | | |
| 10 | −9.539 | 1.20 | 53.9 | 1.71300 |
| 11 | −60.568 | (B.f.) | | |
| f | 36.0006 | 45.0008 | | 58.2016 |
| $d_7$ | 9.4060 | 5.9394 | | 2.7944 |
| B.f. | 12.9007 | 22.6508 | | 36.9513 |

TABLE 4

Aspherical Surface Shape of Eighth Surface of the Second Embodiment $k = 0.0000$
$C_2 = 0.0000$
$C_4 = 0.3012 \times 10^{-4}$
$C_6 = 0.4606 \times 10^{-6}$
$C_8 = -0.3136 \times 10^{-8}$
$C_{10} = 0.7047 \times 10^{-10}$

Third Embodiment

Figure 3:
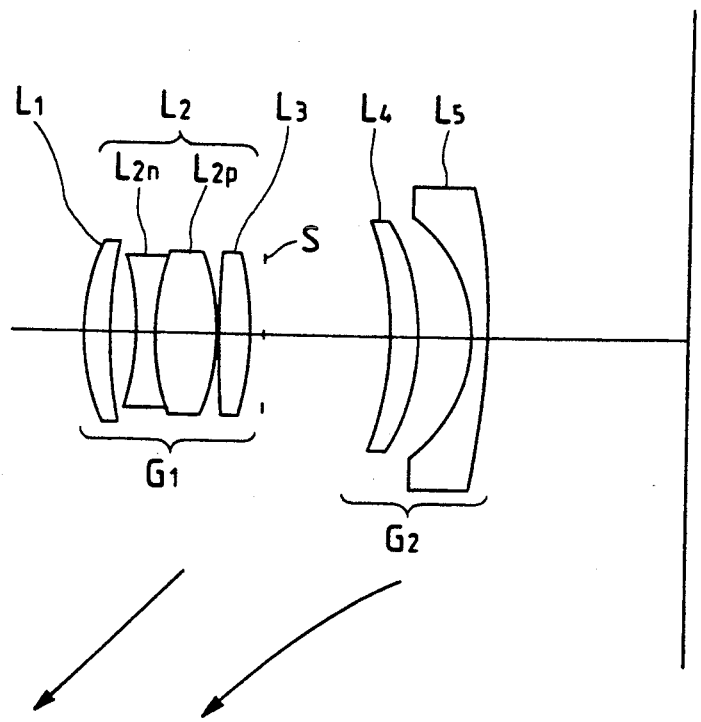
FIG. 3 is a chart showing a lens arrangement of a zoom lens according to the third embodiment of the present invention.

FIG. 3 is a chart showing the lens arrangement of the third embodiment. In the third embodiment, the ninth surface is the aspherical surface, and Tables 5 and 6 below summarize the specifications of the third embodiment, and the aspherical surface coefficients and the like of the ninth surface.

TABLE 5

Specifications of the Third Embodiment $f = 39.0$ to $63.1$
$F_{NO} = 4.00$ to $6.47$
$2\omega = 56.5°$ to $37.6°$

| i | $r_i$ | $d_i$ | $\nu_{di}$ | $n_i$ |
|---|---|---|---|---|
| 1 | 14.035 | 1.80 | 53.9 | 1.71300 |
| 2 | 31.724 | 1.70 | | |
| 3 | −15.075 | 1.20 | 45.0 | 1.74400 |
| 4 | 13.523 | 4.30 | 69.9 | 1.51860 |
| 5 | −13.523 | 0.10 | | |
| 6 | 60.040 | 2.00 | 60.7 | 1.56384 |
| 7 | −24.231 | variable | | |
| 8 | −21.267 | 2.10 | 31.6 | 1.75692 |
| 9 | −14.846 | 3.60 | | |
| 10 | −9.603 | 1.20 | 53.9 | 1.71300 |
| 11 | −43.484 | (B.f.) | | |
| f | 39.0005 | 50.0012 | | 63.1024 |
| $d_7$ | 9.9458 | 6.2791 | | 3.5802 |
| B.f. | 14.0931 | 25.5336 | | 39.1585 |

TABLE 6

Aspherical Surface Shape of Ninth Surface of the Third Embodiment $k = 0.1077 \times 10^{+1}$
$C_2 = 0.0000$
$C_4 = -0.3206 \times 10^{-4}$
$C_6 = -0.3118 \times 10^{-6}$
$C_8 = -0.4991 \times 10^{-8}$
$C_{10} = -0.3329 \times 10^{-11}$

Fourth Embodiment

Figure 4:
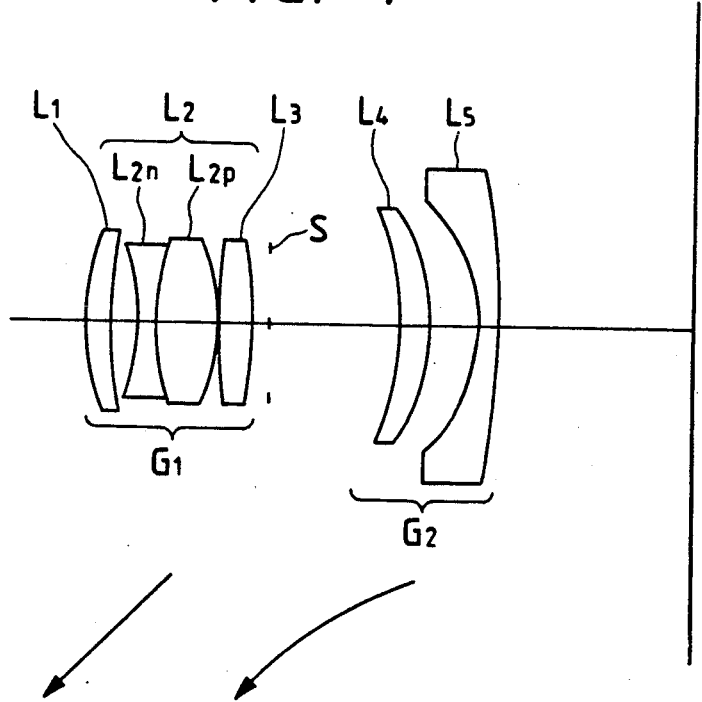
FIG. 4 is a chart showing a lens arrangement of a zoom lens according to the fourth embodiment of the present invention.

FIG. 4 is a chart showing the lens arrangement of the fourth embodiment. In the fourth embodiment, the 11th surface is the aspherical surface, and Tables 7 and 8 below summarize the specifications of the fourth embodiment, and the aspherical surface coefficients and the like of the 11th surface.

TABLE 7

Specifications of the Fourth Embodiment $f = 39.0$ to $63.1$
$F_{NO} = 4.00$ to $6.47$
$2\omega = 56.8°$ to $37.7°$

| i | $r_i$ | $d_i$ | $\nu_{di}$ | $n_i$ |
|---|---|---|---|---|
| 1 | 14.173 | 1.80 | 55.6 | 1.69680 |
| 2 | 30.934 | 1.70 | | |
| 3 | −14.476 | 1.20 | 45.0 | 1.74400 |
| 4 | 14.476 | 4.30 | 69.9 | 1.51860 |
| 5 | −12.645 | 0.10 | | |
| 6 | 45.737 | 2.30 | 60.7 | 1.56384 |
| 7 | −28.834 | variable | | |
| 8 | −16.791 | 2.10 | 31.6 | 1.75692 |
| 9 | −12.676 | 3.60 | | |
| 10 | −10.451 | 1.20 | 53.9 | 1.71300 |
| 11 | −65.212 | (B.f.) | | |
| f | 39.0006 | 50.0015 | | 63.1030 |
| $d_7$ | 10.3636 | 6.6969 | | 3.9980 |
| B.f. | 13.9256 | 25.3662 | | 38.9913 |

TABLE 8

Aspherical Surface Shape of 11th Surface of the Fourth Embodiment $k = -0.9151 \times 10^{+1}$
$C_2 = 0.0000$
$C_4 = 0.3130 \times 10^{-4}$
$C_6 = 0.3607 \times 10^{-6}$
$C_8 = -0.5020 \times 10^{-8}$
$C_{10} = 0.1939 \times 10^{-10}$

Fifth Embodiment

Figure 5:
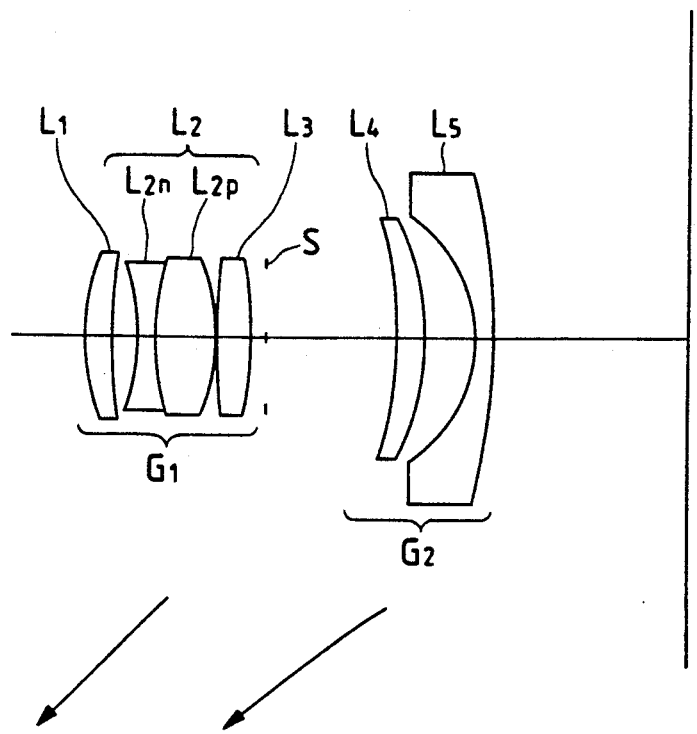
FIG. 5 is a chart showing a lens arrangement of a zoom lens according to the fifth embodiment of the present invention.

FIG. 5 is a chart showing the lens arrangement of the fifth embodiment. In the fifth embodiment, the eighth surface is the aspherical surface, and Tables 9 and 10 below summarize the specifications of the fifth embodiment, and the aspherical surface coefficients and the like of the eighth surface.

TABLE 9

Specifications of the Fifth Embodiment $f = 39.0$ to $63.1$
$F_{NO} = 4.11$ to $6.66$
$2\omega = 56.7°$ to $37.7°$

| i | $r_i$ | $d_i$ | $\nu_{di}$ | $n_i$ |
|---|---|---|---|---|
| 1 | 14.320 | 1.80 | 55.6 | 1.69680 |
| 2 | 31.046 | 1.70 | | |
| 3 | −14.477 | 1.20 | 45.0 | 1.74400 |
| 4 | 14.477 | 4.30 | 69.9 | 1.51860 |
| 5 | −12.897 | 0.10 | | |
| 6 | 46.312 | 2.30 | 60.7 | 1.56384 |
| 7 | −27.107 | variable | | |
| 8 | −22.353 | 2.10 | 31.6 | 1.75692 |

TABLE 9-continued

Specifications of the Fifth Embodiment
f = 39.0 to 63.1
$F_{NO}$ = 4.11 to 6.66
$2\omega$ = 56.7° to 37.7°

| i | $r_i$ | $d_i$ | $\nu_{di}$ | $n_i$ |
|---|---|---|---|---|
| 9 | −15.730 | 3.60 | | |
| 10 | −9.612 | 1.20 | 53.9 | 1.71300 |
| 11 | −40.057 | (B.f.) | | |
| f | 39.0006 | 50.0014 | | 63.1028 |
| $d_7$ | 10.3364 | 6.6697 | | 3.9708 |
| B.f. | 13.9930 | 25.4338 | | 39.0591 |

TABLE 10

Figure 6:
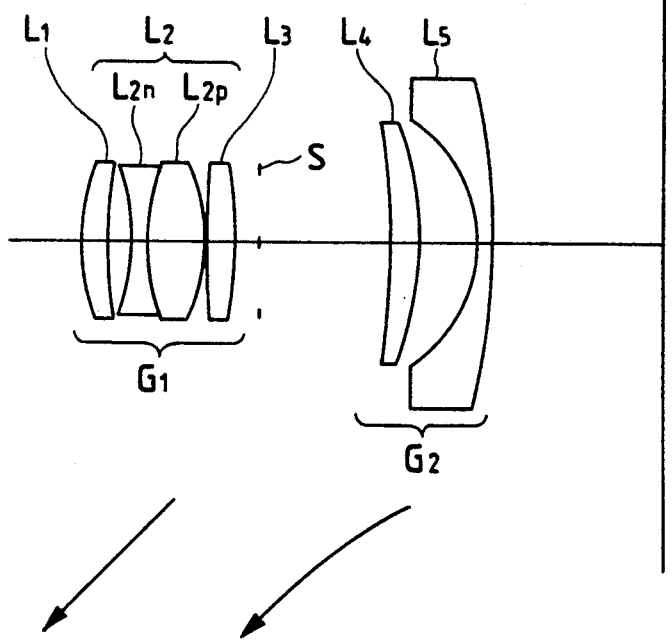
FIG. 6 is a chart showing a lens arrangement of a zoom lens according to the sixth embodiment of the present invention.

Aspherical Surface Shape of Eighth Surface
of the Fifth Embodiment k = 0.0000
$C_2$ = 0.0000
$C_4$ = 0.3155 × $10^{-4}$
$C_6$ = 0.5395 × $10^{-6}$
$C_8$ = −0.6964 × $10^{-9}$
$C_{10}$ = 0.4240 × $10^{-10}$ Sixth Embodiment FIG. 6 is a chart showing the lens arrangement of the sixth embodiment. In the sixth embodiment, the eighth surface is also the aspherical surface, and Tables 11 and 12 below summarize the specifications of the sixth embodiment, and the aspherical surface coefficients and the like of the eighth surface.

TABLE 11

Specifications of the Sixth Embodiment
f = 39.0 to 63.1
$F_{NO}$ = 4.01 to 6.48
$2\omega$ = 56.4° to 37.4°

| i | $r_i$ | $d_i$ | $\nu_{di}$ | $n_i$ |
|---|---|---|---|---|
| 1 | 14.111 | 1.80 | 53.9 | 1.71300 |
| 2 | 33.549 | 1.50 | | |
| 3 | −14.031 | 1.30 | 45.0 | 1.74400 |
| 4 | 14.031 | 4.00 | 69.9 | 1.51860 |
| 5 | −11.781 | 0.20 | | |
| 6 | 59.921 | 2.00 | 59.0 | 1.51823 |
| 7 | −27.980 | variable | | |
| 8 | −31.172 | 2.10 | 27.8 | 1.74077 |
| 9 | −19.989 | 4.00 | | |
| 10 | −9.664 | 1.20 | 50.2 | 1.72000 |
| 11 | −40.460 | (B.f.) | | |
| f | 39.0001 | 50.0003 | | 63.1006 |
| $d_7$ | 11.2726 | 7.6059 | | 4.9070 |
| B.f. | 12.2073 | 22.7844 | | 35.3808 |

TABLE 12

Figure 7:
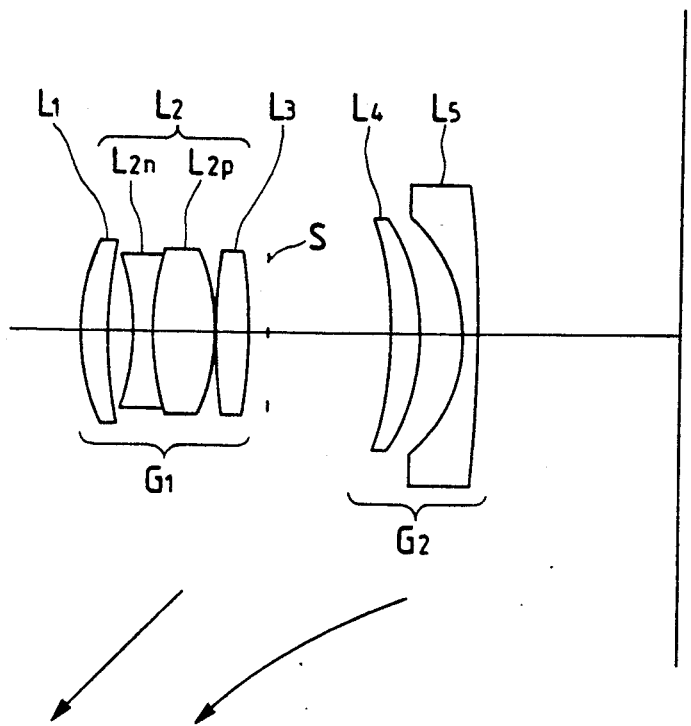
FIG. 7 is a chart showing a lens arrangement of a zoom lens according to the seventh embodiment of the present invention.

Aspherical Surface Shape of Eighth Surface
of the Sixth Embodiment k = 0.0000
$C_2$ = 0.0000
$C_4$ = 0.3925 × $10^{-4}$
$C_6$ = 0.1301 × $10^{-5}$
$C_8$ = −0.1772 × $10^{-7}$
$C_{10}$ = 0.1695 × $10^{-9}$ Seventh Embodiment FIG. 7 is a chart showing the lens arrangement of the seventh embodiment. In the seventh embodiment, the tenth surface is the aspherical surface, and Tables 13 and 14 below summarize the specifications of the seventh embodiment, and the aspherical surface coefficients and the like of the tenth surface.

TABLE 13

Specifications of the Seventh Embodiment
f = 39.0 to 63.1
$F_{NO}$ = 4.00 to 6.46
$2\omega$ = 56.6° to 37.7°

| i | $r_i$ | $d_i$ | $\nu_{di}$ | $n_i$ |
|---|---|---|---|---|
| 1 | 13.693 | 1.80 | 55.6 | 1.69680 |
| 2 | 29.737 | 1.70 | | |
| 3 | −15.115 | 1.30 | 45.0 | 1.74400 |
| 4 | 13.878 | 4.40 | 69.9 | 1.51860 |
| 5 | −12.550 | 0.20 | | |
| 6 | 38.818 | 2.00 | 60.7 | 1.56384 |
| 7 | −38.818 | variable | | |
| 8 | −21.394 | 2.10 | 35.0 | 1.74950 |
| 9 | −13.074 | 3.00 | | |
| 10 | −9.525 | 1.20 | 53.9 | 1.71300 |
| 11 | −66.661 | (B.f.) | | |
| f | 39.0003 | 50.0004 | | 63.1005 |
| $d_7$ | 10.1954 | 6.3268 | | 3.4793 |
| B.f. | 14.4196 | 26.1126 | | 40.0378 |

TABLE 14

Figure 8:
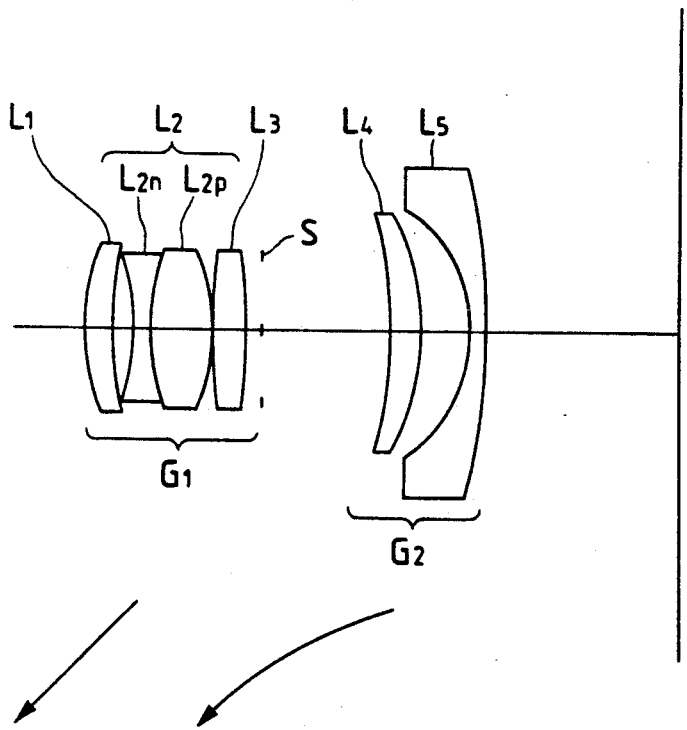
FIG. 8 is a chart showing a lens arrangement of a zoom lens according to the eighth embodiment of the present invention.

Aspherical Surface Shape of Tenth Surface
of the Seventh Embodiment k = 0.0000
$C_2$ = 0.0000
$C_4$ = −0.1024 × $10^{-3}$
$C_6$ = −0.4683 × $10^{-6}$
$C_8$ = 0.5245 × $10^{-8}$
$C_{10}$ = −0.6514 × $10^{-10}$ Eighth Embodiment FIG. 8 is a chart showing the lens arrangement of the eighth embodiment. In the eighth embodiment, the eighth surface is the aspherical surface, and Tables 15 and 16 below summarize the specifications of the eighth embodiment, and the aspherical surface coefficients and the like of the eighth surface.

TABLE 15

Specifications of the Eighth Embodiment
f = 39.0 to 63.1
$F_{NO}$ = 4.10 to 6.63
$2\omega$ = 56.7° to 37.7°

| i | $r_i$ | $d_i$ | $\nu_{di}$ | $n_i$ |
|---|---|---|---|---|
| 1 | 13.823 | 2.00 | 57.0 | 1.62280 |
| 2 | 34.400 | 1.45 | | |
| 3 | −14.361 | 1.20 | 45.0 | 1.74400 |
| 4 | 14.361 | 4.30 | 69.9 | 1.51860 |
| 5 | −12.556 | 0.10 | | |
| 6 | 46.841 | 2.30 | 56.1 | 1.56883 |
| 7 | −28.975 | variable | | |
| 8 | −22.324 | 2.10 | 37.0 | 1.81474 |
| 9 | −16.019 | 3.60 | | |
| 10 | −9.505 | 1.20 | 55.6 | 1.69680 |
| 11 | −41.707 | (B.f.) | | |
| f | 39.0002 | 50.0021 | | 63.0985 |
| $d_7$ | 10.3950 | 6.7280 | | 4.0300 |
| B.f. | 13.9859 | 25.4275 | | 39.0473 |

TABLE 16

Aspherical Surface Shape of Eighth Surface
of the Eighth Embodiment k = 0.0000
$C_2$ = 0.0000
$C_4$ = 0.3011 × $10^{-4}$
$C_6$ = 0.5877 × $10^{-6}$
$C_8$ = −0.2123 × $10^{-8}$
$C_{10}$ = 0.5879 × $10^{-10}$

Ninth Embodiment

Figure 9:
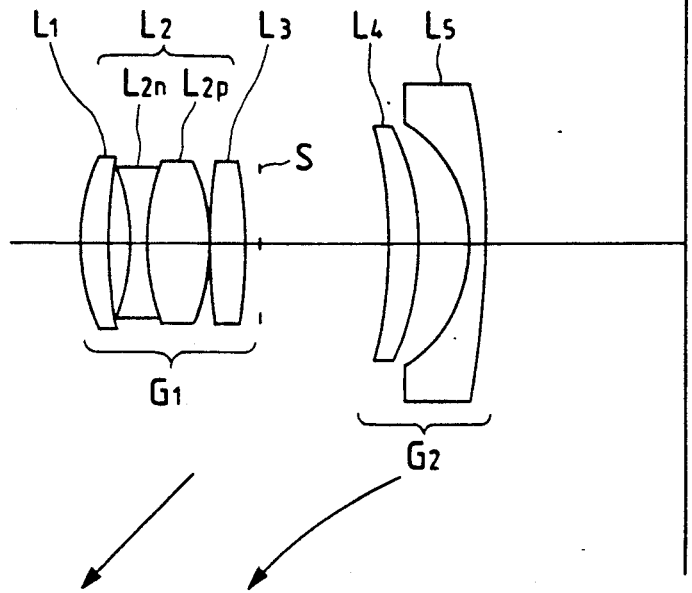
FIG. 9 is a chart showing a lens arrangement of a zoom lens according to the ninth embodiment of the present invention.

FIG. 9 is a chart showing the lens arrangement of the ninth embodiment. In the ninth embodiment, the eighth surface is also the aspherical surface, and Tables 17 and 18 below summarize the specifications of the ninth embodiment, and the aspherical surface coefficients and the like of the eighth surface.

TABLE 17

Specifications of the Ninth Embodiment f = 39.0 to 63.1
$F_{NO}$ = 4.11 to 6.64
$2\omega$ = 56.7° to 37.7°

| i | $r_i$ | $d_i$ | $\nu_{di}$ | $n_i$ |
|---|---|---|---|---|
| 1 | 12.702 | 2.00 | 64.1 | 1.51680 |
| 2 | 38.481 | 1.45 | | |
| 3 | −14.154 | 1.20 | 45.0 | 1.74400 |
| 4 | 14.154 | 4.30 | 64.1 | 1.51680 |
| 5 | −11.897 | 0.10 | | |
| 6 | 40.460 | 2.30 | 58.5 | 1.61272 |
| 7 | −40.460 | variable | | |
| 8 | −22.343 | 2.10 | 40.5 | 1.73077 |
| 9 | −15.717 | 3.60 | | |
| 10 | −9.112 | 1.20 | 60.0 | 1.64000 |
| 11 | −43.688 | (B.f.) | | |
| f | 39.0008 | 49.9992 | | 63.1000 |
| $d_7$ | 10.3220 | 6.6560 | | 3.9570 |
| B.f. | 13.9749 | 25.4128 | | 39.0370 |

TABLE 18

Aspherical Surface Shape of Eighth Surface
of the Ninth Embodiment k = 0.0000
$C_2$ = 0.0000
$C_4$ = 0.3967 × $10^{-4}$
$C_6$ = 0.7701 × $10^{-6}$
$C_8$ = −0.4227 × $10^{-8}$
$C_{10}$ = 0.1057 × $10^{-9}$

Tenth Embodiment

Figure 10:
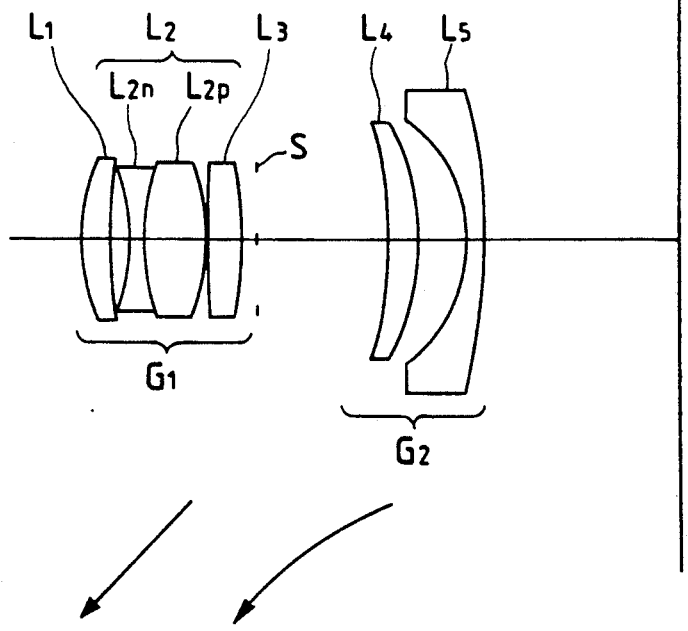
FIG. 10 is a chart showing a lens arrangement of a zoom lens according to the tenth embodiment of the present invention.

FIG. 10 is a chart showing the lens arrangement of the tenth embodiment. In the tenth embodiment, the eighth surface is also the aspherical surface, and Tables 19 and 20 below summarize the specifications of the tenth embodiment, and the aspherical surface coefficients and the like of the eighth surface.

TABLE 19

Specifications of the Tenth Embodiment f = 39.0 to 63.1
$F_{NO}$ = 4.11 to 6.64
$2\omega$ = 56.6° to 37.7°

| i | $r_i$ | $d_i$ | $\nu_{di}$ | $n_i$ |
|---|---|---|---|---|
| 1 | 13.495 | 2.00 | 58.5 | 1.61272 |
| 2 | 44.225 | 1.20 | | |
| 3 | −15.587 | 1.20 | 39.6 | 1.80454 |
| 4 | 15.587 | 4.30 | 59.0 | 1.51823 |
| 5 | −13.242 | 0.10 | | |
| 6 | 206.972 | 2.30 | 46.5 | 1.80411 |
| 7 | −28.299 | variable | | |
| 8 | −22.785 | 2.10 | 37.0 | 1.81474 |
| 9 | −16.134 | 3.60 | | |
| 10 | −9.851 | 1.20 | 49.4 | 1.77279 |
| 11 | −36.468 | (B.f.) | | |
| f | 39.0010 | 49.9992 | | 63.1000 |
| $d_7$ | 10.5689 | 6.9030 | | 4.2040 |
| B.f. | 14.0020 | 25.4397 | | 39.0640 |

TABLE 20

Aspherical Surface Shape of Eighth Surface
of the Tenth Embodiment k = 0.0000
$C_2$ = 0.0000
$C_4$ = 0.2748 × $10^{-4}$
$C_6$ = 0.5416 × $10^{-6}$
$C_8$ = −0.1523 × $10^{-8}$
$C_{10}$ = 0.4006 × $10^{-10}$

11th Embodiment

Figure 11:
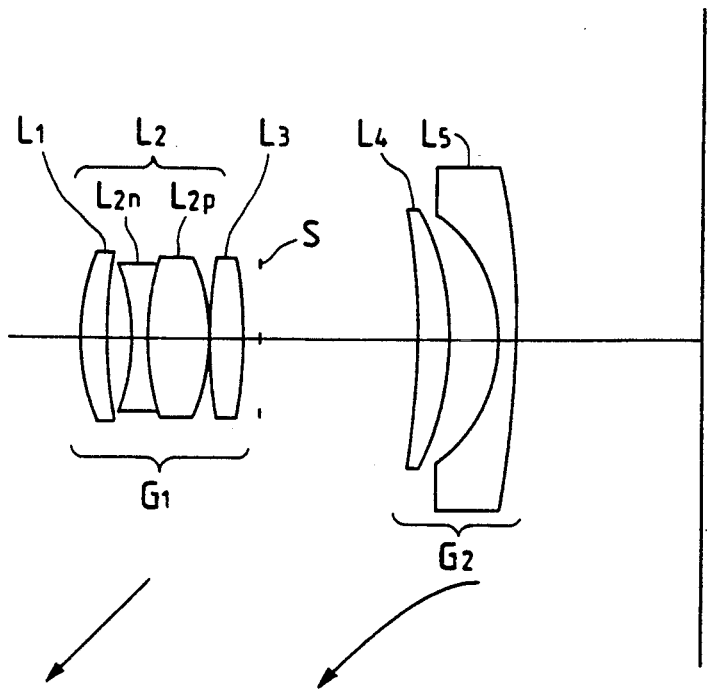
FIG. 11 is a chart showing a lens arrangement of a zoom lens according to the 11th embodiment of the present invention.

FIG. 11 is a chart showing the lens arrangement of the 11th embodiment. In the 11th embodiment, the eighth surface is also the aspherical surface, and Tables 21 and 22 below summarize the specifications of the 11th embodiment, and the aspherical surface coefficients and the like of the eighth surface.

TABLE 21

Specifications of the 11th Embodiment f = 39.0 to 68.0
$F_{NO}$ = 4.09 to 7.13
$2\omega$ = 56.8° to 35.0°

| i | $r_i$ | $d_i$ | $\nu_{di}$ | $n_i$ |
|---|---|---|---|---|
| 1 | 14.141 | 2.00 | 45.9 | 1.54814 |
| 2 | 49.596 | 1.45 | | |
| 3 | −13.789 | 1.20 | 40.9 | 1.79631 |
| 4 | 16.887 | 4.30 | 64.1 | 1.51680 |
| 5 | −11.932 | 0.10 | | |
| 6 | 44.929 | 2.30 | 59.0 | 1.51823 |
| 7 | −24.795 | variable | | |
| 8 | −29.709 | 2.10 | 37.0 | 1.81474 |
| 9 | −18.512 | 3.60 | | |
| 10 | −9.681 | 1.20 | 55.6 | 1.69680 |
| 11 | −53.162 | (B.f.) | | |
| f | 39.0002 | 50.0005 | | 68.0003 |
| $d_7$ | 12.2358 | 8.4224 | | 4.8437 |
| B.f. | 12.9091 | 23.9095 | | 41.9091 |

TABLE 22

Aspherical Surface Shape of Eighth Surface
of the 11th Embodiment k = 0.0000
$C_2$ = 0.0000
$C_4$ = 0.3456 × $10^{-4}$
$C_6$ = 0.9885 × $10^{-6}$
$C_8$ = −0.1326 × $10^{-7}$
$C_{10}$ = 0.1499 × $10^{-9}$

12th Embodiment

Figure 12:
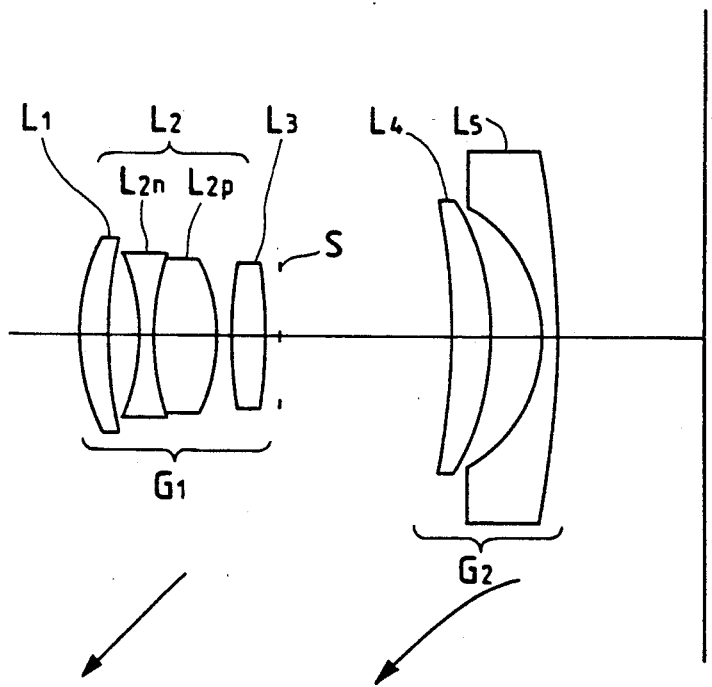
FIG. 12 is a chart showing a lens arrangement of a zoom lens according to the 12th embodiment of the present invention.

FIG. 12 is a chart showing the lens arrangement of the 12th embodiment. In the 12th embodiment, the eighth surface is also the aspherical surface, and Tables 23 and 24 below summarize the specifications of the 12th embodiment, and the aspherical surface coefficients and the like of the eighth surface.

TABLE 23

Specifications of the 12th Embodiment f = 36.0 to 68.0
$F_{NO}$ = 4.10 to 7.74
$2\omega$ = 60.8° to 35.4°

| i | $r_i$ | $d_i$ | $\nu_{di}$ | $n_i$ |
|---|---|---|---|---|
| 1 | 14.424 | 2.00 | 38.0 | 1.60342 |
| 2 | 29.870 | 2.00 | | |
| 3 | −13.961 | 1.20 | 40.9 | 1.79631 |
| 4 | 17.019 | 4.30 | 64.1 | 1.51680 |
| 5 | −11.539 | 1.00 | | |
| 6 | 24.938 | 2.30 | 69.9 | 1.51860 |
| 7 | −37.713 | variable | | |
| 8 | −28.050 | 2.60 | 37.0 | 1.81474 |

TABLE 23-continued

Specifications of the 12th Embodiment $f = 36.0$ to $68.0$
$F_{NO} = 4.10$ to $7.74$
$2\omega = 60.8°$ to $35.4°$

| i | $r_i$ | $d_i$ | $\nu_{di}$ | $n_i$ |
|---|---|---|---|---|
| 9 | −17.613 | 3.60 | | |
| 10 | −9.898 | 1.20 | 55.6 | 1.69680 |
| 11 | −57.061 | (B.f.) | | |
| f | 36.0001 | 50.0002 | | 68.0006 |
| $d_7$ | 13.2090 | 7.7490 | | 4.0325 |
| B.f. | 10.1790 | 24.7176 | | 43.4102 |

TABLE 24

Aspherical Surface Shape of Eighth Surface
of the 12th Embodiment $k = 0.0000$
$C_2 = 0.0000$
$C_4 = 0.2711 \times 10^{-4}$
$C_6 = 0.7873 \times 10^{-6}$
$C_8 = -0.9386 \times 10^{-8}$
$C_{10} = 0.1025 \times 10^{-9}$ The zoom lens according to the present invention is preferably arranged to satisfy the conditions (1) to (4). Thus, Table 25 below summarizes data of the respective embodiments for the conditions (1) to (4).

TABLE 25

Condition Correspondence Table (1)

| Embodiments | $dL_2/f_W$ | $(nL_{2n}-nL_{2p}) \cdot f_W/r_4$ | $fL_2/f_1$ | $fL_3/f_1$ |
|---|---|---|---|---|
| 1st | 0.136 | 0.608 | −2.504 | 1.294 |
| 2nd | 0.147 | 0.599 | −2.830 | 1.244 |
| 3rd | 0.141 | 0.650 | −2.030 | 1.235 |
| 4th | 0.141 | 0.607 | −2.324 | 1.269 |
| 5th | 0.141 | 0.607 | −2.199 | 1.227 |
| 6th | 0.136 | 0.627 | −2.422 | 1.427 |
| 7th | 0.146 | 0.633 | −2.571 | 1.368 |
| 8th | 0.141 | 0.612 | −2.309 | 1.273 |
| 9th | 0.141 | 0.626 | −2.553 | 1.335 |
| 10th | 0.141 | 0.716 | −1.793 | 1.244 |
| 11th | 0.141 | 0.646 | −1.853 | 1.199 |
| 12th | 0.153 | 0.591 | −2.115 | 1.127 |

Furthermore, the zoom lens according to the present invention is preferably arranged to satisfy the conditions (5) to (7) under the above-mentioned conditions (1) to (4). Table 26 below summarizes data for the respective embodiments corresponding to the conditions (5) to (7).

TABLE 26

Condition Correspondence Table (2)

| Embodiments | $\Sigma d_W/f_W$ | $fL_1 \cdot L_2/f_1$ | $\nu L_{2p}-\nu L_{2n}$ |
|---|---|---|---|
| 1st | 0.711 | 4.176 | 24.9 |
| 2nd | 0.778 | 4.940 | 24.9 |
| 3rd | 0.717 | 4.890 | 24.9 |
| 4th | 0.735 | 4.672 | 24.9 |
| 5th | 0.734 | 5.440 | 24.9 |
| 6th | 0.753 | 3.235 | 24.9 |
| 7th | 0.715 | 3.590 | 24.9 |
| 8th | 0.734 | 4.708 | 24.9 |
| 9th | 0.733 | 4.091 | 19.1 |
| 10th | 0.733 | 4.956 | 19.4 |
| 11th | 0.782 | 7.142 | 23.2 |
| 12th | 0.928 | 13.113 | 23.2 |

The present invention is not limited to the above embodiments, and various other arrangements may be adopted without departing from the scope of the invention.

What is claimed is:

1. A zoom lens, which includes a first lens group $G_1$ having a positive refracting power and a second lens group $G_2$ having a negative refracting power, and performs a zooming operation from a wide-angle end to a telephoto end by decreasing a space between said first and second lens groups $G_1$ and $G_2$, wherein said first lens group $G_1$ has, in order from an object side, a positive meniscus lens component $L_1$ with a convex surface facing the object side, a cemented negative lens component $L_2$ constituted by a double-concave negative lens component $L_{2n}$ and a double-convex positive lens component $L_{2p}$, and having a meniscus shape as a whole, and a double-convex positive lens component $L_3$, said second lens group $G_2$ has, in order from the object side, a positive meniscus lens component $L_4$ with a convex surface facing an image side, and a negative meniscus lens component $L_5$ with a convex surface facing the image side, and said zoom lens is arranged to satisfy the following conditions:

$0.09 < dL_2/f_W < 0.18$ $0.45 < (nL_{2n}-nL_{2p}) \cdot f_W/r_4 < 0.9$ $-4 < fL_2/f_1 < -1.8$ $1.1 < fL_3/f_1 < 1.6$ where $f_W$: the focal length of the entire system at the wide-angle end $dL_2$: the axial lens thickness of said cemented negative lens component $L_2$ in said first lens group $G_1$ $nL_{2n}$: the refractive index of said double-concave negative lens component $L_{2n}$ forming said cemented negative lens component $L_2$ in said first lens group $G_1$ $nL_{2p}$: the refractive index of said double-convex positive lens component $L_{2p}$ forming said cemented negative lens component $L_2$ in said first lens group $G_1$ $r_4$: the radius of curvature of the junction surface in said cemented negative lens component $L_2$ in said first lens group $G_1$ $fL_2$: the focal length of said cemented negative lens component $L_2$ in said first lens group $G_1$ $fL_3$: the focal length of said double-convex positive lens component $L_3$ in said first lens group $G_1$ $f_1$: the focal length of said first lens group $G_1$.

2. A zoom lens according to claim 1, wherein said zoom lens is arranged to satisfy the following conditions:

$0.5 < \Sigma d_W/f_W < 0.85$ $2 < fL_1 \cdot L_2/f_1 < 9$ where $\Sigma d_W$: the axial lens thickness from the most object-side lens surface to the most image-side lens surface of said zoom lens at the wide-angle end $fL_1 \cdot L_2$: the composite focal length of said positive meniscus lens component $L_1$ and said cemented negative lens component $L_2$ in said first lens group $G_1$.

3. A zoom lens according to claim 2, wherein at least one lens surface in said second lens group $G_2$ is formed to have an aspherical surface shape.

4. A zoom lens according to claim 3, wherein said zoom lens is arranged to satisfy the following condition:

$$17 < \nu L_{2p} - \nu L_{2n} < 30$$

where
$\nu L_{2p}$: the Abbe's number of said double-convex positive lens component $L_{2p}$ forming said cemented negative lens component $L_2$ in said first lens group $G_1$ $\nu L_{2n}$: the Abbe's number of said double-concave negative lens component $L_{2n}$ forming said cemented negative lens component $L_2$ in said first lens group $G_1$.

5. A zoom lens according to claim 3, wherein the aspherical surface shape in said second lens group $G_2$ is formed so that a positive refracting power is gradually increased from the optical axis toward a peripheral portion on the aspherical surface.

6. A zoom lens according to claim 5, wherein said zoom lens is arranged to satisfy the following condition:

$$17 < \nu L_{2p} - \nu L_{2n} < 30$$

where
$\nu L_{2p}$: the Abbe's number of said double-convex positive lens component $L_{2p}$ forming said cemented negative lens component $L_2$ in said first lens group $G_1$ $\nu L_{2n}$: the Abbe's number of said double-concave negative lens component $L_{2n}$ forming said cemented negative lens component $L_2$ in said first lens group $G_1$.

7. A zoom lens according to claim 3, wherein the aspherical surface shape in said second lens group $G_2$ is formed so that a negative refracting power is gradually decreased from the optical axis toward a peripheral portion on the aspherical surface.

8. A zoom lens according to claim 7, wherein said zoom lens is arranged to satisfy the following condition:

$$17 < \nu L_{2p} - \nu L_{2n} < 30$$

where
$\nu L_{2p}$: the Abbe's number of said double-convex positive lens component $L_{2p}$ forming said cemented negative lens component $L_2$ in said first lens group $G_1$ $\nu L_{2n}$: the Abbe's number of said double-concave negative lens component $L_{2n}$ forming said cemtend negative lens component $L_2$ in said first lens group $G_1$.

9. A zoom lens according to claim 1, wherein at least one lens surface in said second lens group $G_2$ is formed to have an aspherical surface shape.

10. A zoom lens according to claim 9, wherein said zoom lens is arranged to satisfy the following condition:

$$17 < \nu L_{2p} - \nu L_{2n} < 30$$

where
$\nu L_{2p}$: the Abbe's number of said double-convex positive lens component $L_{2p}$ forming said cemented negative lens component $L_2$ in said first lens group $G_1$ $\nu$ the Abbe's number of said double-concave negative lens component $L_{2n}$ forming said cemented negative lens component $L_2$ in said first lens group $G_1$.

* * * * *